US012660972B2

(12) United States Patent
Long et al.

(10) Patent No.: US 12,660,972 B2
(45) Date of Patent: Jun. 23, 2026

(54) ROBOT CLEANER FOR CLIMBING AND CLEANING STAIRS

(71) Applicant: Shanghai Rushen Robotics Co., Ltd, Shanghai (CN)

(72) Inventors: Yun Long, Newark, CA (US); Youdong Wang, Newark, CA (US); Feng Zhu, Newark, CA (US)

(73) Assignee: Shanghai Rushen Robotics Co., Ltd, Shanghai (CN)

( * ) Notice: Subject to any disclaimer, the term of this patent is extended or adjusted under 35 U.S.C. 154(b) by 555 days.

(21) Appl. No.: 18/201,109

(22) Filed: May 23, 2023

(65) Prior Publication Data

US 2024/0389811 A1 Nov. 28, 2024

(51) Int. Cl.
| | |
|---|---|
| *A47L 9/28* | (2006.01) |
| *A47L 9/00* | (2006.01) |
| *A47L 11/40* | (2006.01) |
| *G05B 19/4155* | (2006.01) |
| *G05D 1/00* | (2024.01) |
| *H02P 5/74* | (2006.01) |

(52) U.S. Cl.
CPC ............. *A47L 9/2852* (2013.01); *A47L 9/009* (2013.01); *A47L 9/2805* (2013.01); *A47L 11/4011* (2013.01); *A47L 11/4066* (2013.01); *A47L 11/4072* (2013.01); *G05B 19/4155* (2013.01); *G05D 1/024* (2013.01); *H02P 5/74* (2013.01); *A47L 2201/04* (2013.01); *G05B 2219/45098* (2013.01)

(58) Field of Classification Search
CPC ...... A47L 9/2852; A47L 9/009; A47L 9/2805; A47L 11/4011; A47L 11/4066; A47L 11/4072; A47L 2201/04; G05B 19/4155; G05B 2219/45098; G05D 1/024; H02P 5/74
See application file for complete search history.

(56) References Cited

U.S. PATENT DOCUMENTS

| | | | | |
|---|---|---|---|---|
| 5,515,934 | A * | 5/1996 | Davis ................... | B62D 57/024 901/50 |
| 2016/0362147 | A1* | 12/2016 | Mailey ................... | A61G 5/061 |
| 2024/0034117 | A1* | 2/2024 | Panigrahi ............... | B60P 1/006 |

FOREIGN PATENT DOCUMENTS

| | | | | |
|---|---|---|---|---|
| CN | 111387882 | A * | 7/2020 | .......... A47L 11/4063 |
| CN | 217365656 | U * | 9/2022 | |

OTHER PUBLICATIONS

Lei Zhang, A New Concept Stair-Cleaning Robot, Aug. 2016, ASME, 045001-1-0045001-10 (Year: 2016).*

* cited by examiner

*Primary Examiner* — Bickey Dhakal
(74) *Attorney, Agent, or Firm* — JCIPRNET

(57) ABSTRACT

Embodiments of the disclosure provide a robot cleaner for cleaning a stair. The robot cleaner includes a main body configured to rotate around a first shaft. The robot cleaner further includes at least one leg each configured to rotate around a second shaft. The robot cleaner also includes at least one connector each configured to connect each leg to the main body. Each connector comprises a first end attached to the first shaft and a second end attached to the second shaft. The robot cleaner is configured to climb the stair by first lifting the main body onto a tread of the stair through rotations of the main body and the at least one connector and then lifting the at least one leg onto the tread through rotations of the at least one connector and the at least one leg.

20 Claims, 10 Drawing Sheets

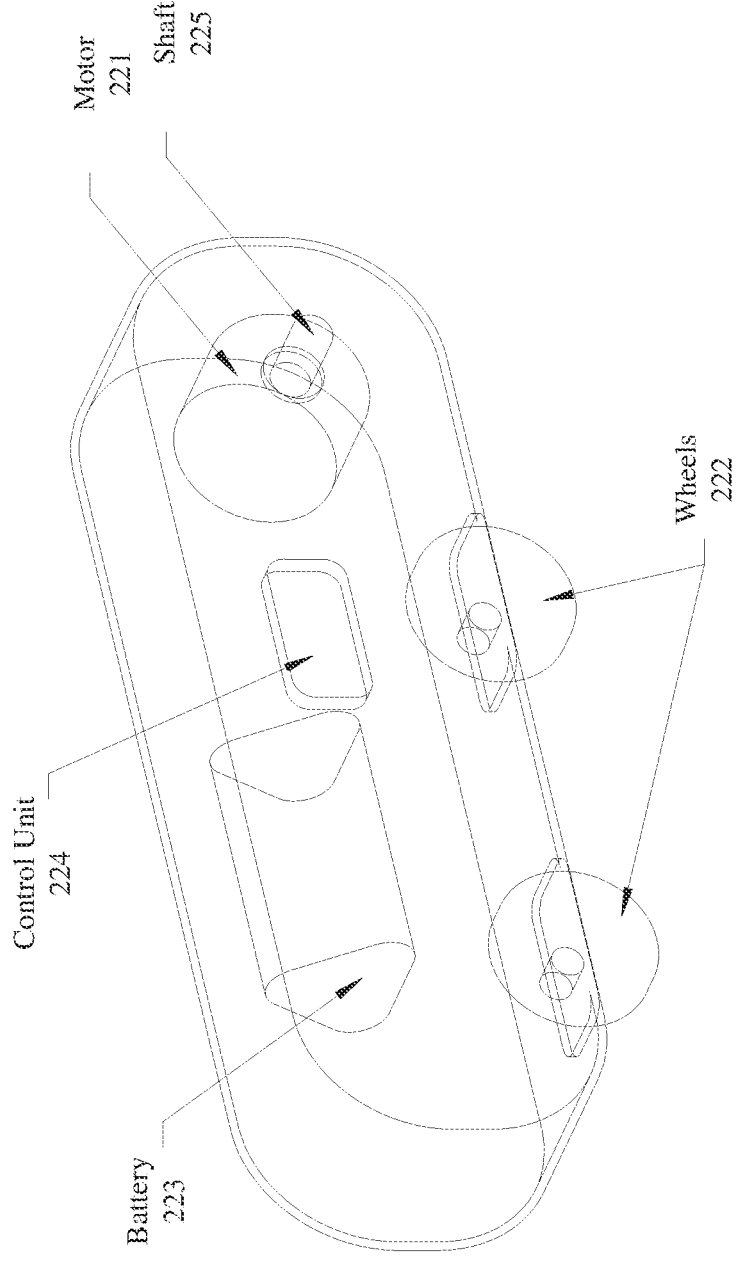
FIG. 2B

Stairs 301

Robot Cleaner 100

400

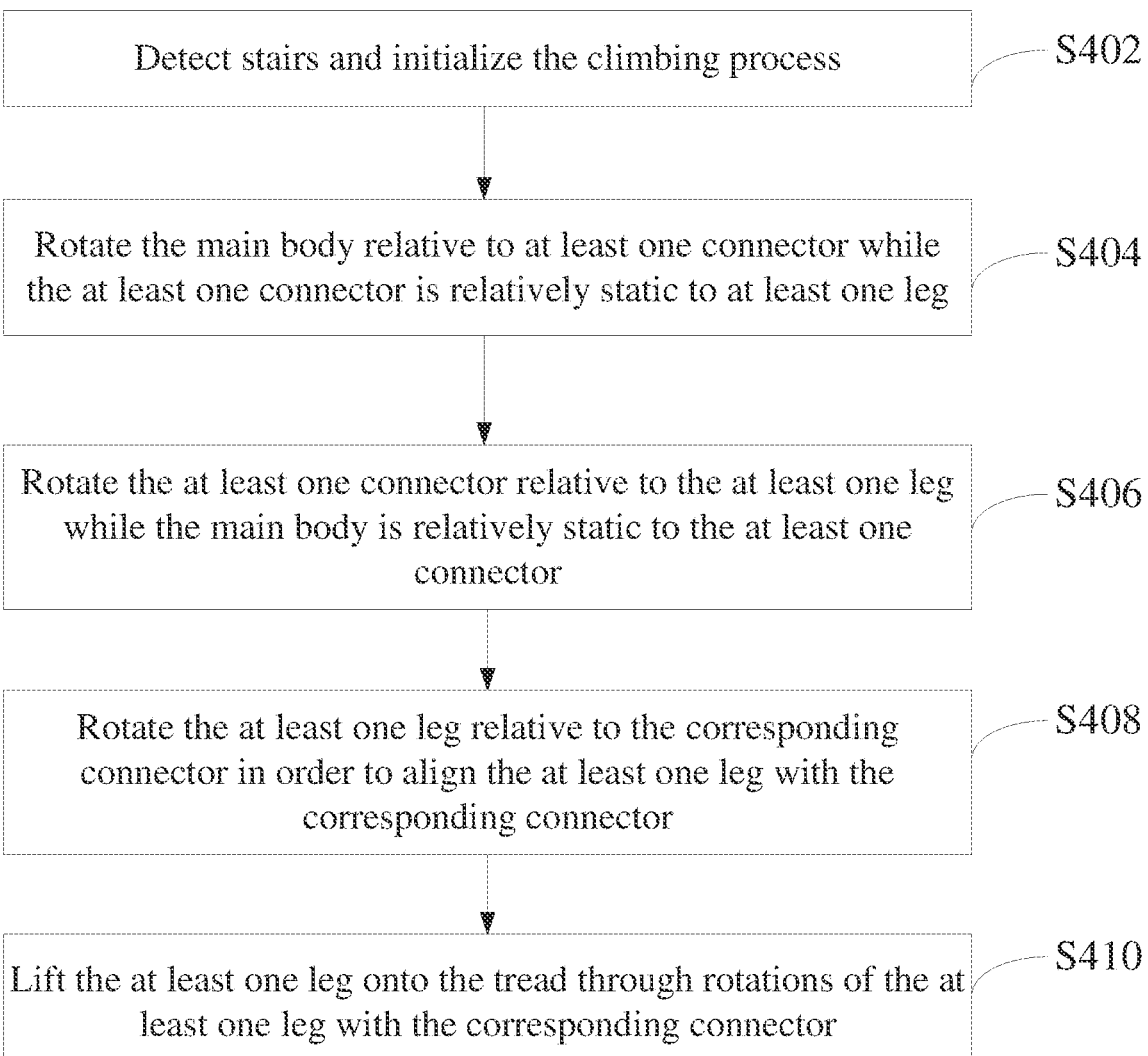

Detect stairs and initialize the climbing process — S402

Rotate the main body relative to at least one connector while the at least one connector is relatively static to at least one leg — S404

Rotate the at least one connector relative to the at least one leg while the main body is relatively static to the at least one connector — S406

Rotate the at least one leg relative to the corresponding connector in order to align the at least one leg with the corresponding connector — S408

Lift the at least one leg onto the tread through rotations of the at least one leg with the corresponding connector — S410

FIG. 4

Robot Cleaner 100

Stairs 501

600

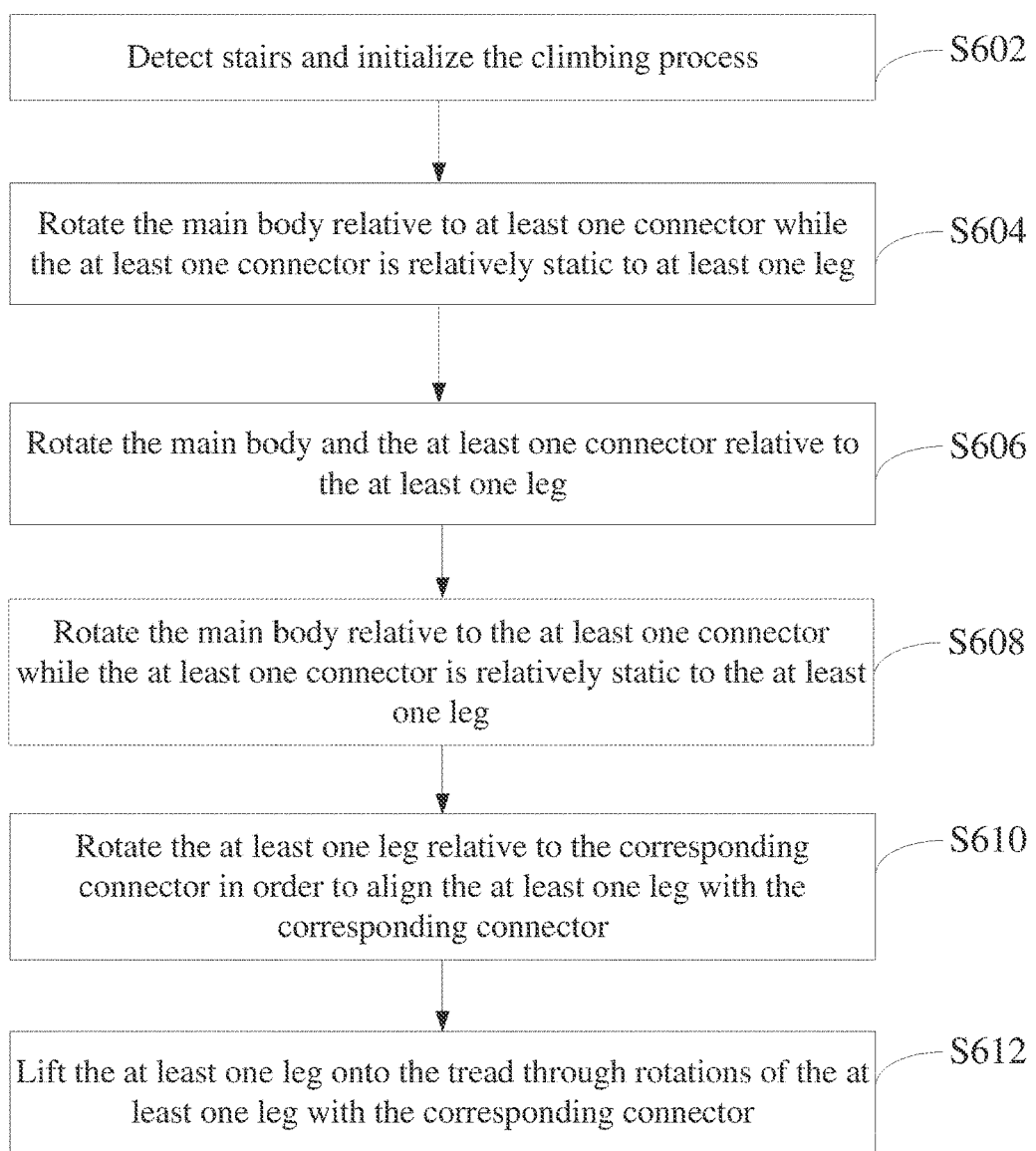

Detect stairs and initialize the climbing process — S602

Rotate the main body relative to at least one connector while the at least one connector is relatively static to at least one leg — S604

Rotate the main body and the at least one connector relative to the at least one leg — S606

Rotate the main body relative to the at least one connector while the at least one connector is relatively static to the at least one leg — S608

Rotate the at least one leg relative to the corresponding connector in order to align the at least one leg with the corresponding connector — S610

Lift the at least one leg onto the tread through rotations of the at least one leg with the corresponding connector — S612

FIG. 6

Robot Cleaner
100

Stairs
701

<u>800</u>

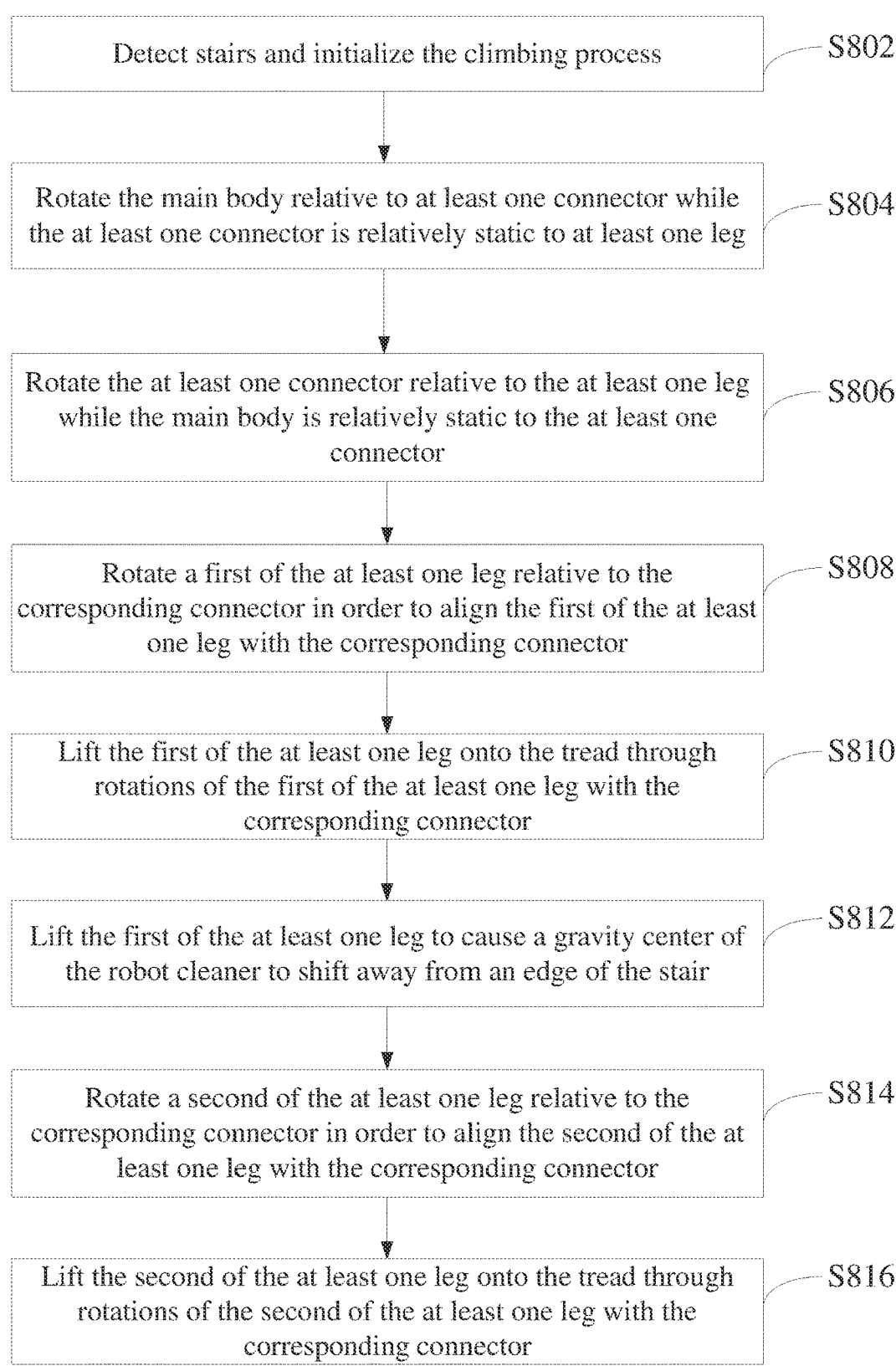

| Detect stairs and initialize the climbing process | — S802 |

| Rotate the main body relative to at least one connector while the at least one connector is relatively static to at least one leg | — S804 |

| Rotate the at least one connector relative to the at least one leg while the main body is relatively static to the at least one connector | — S806 |

| Rotate a first of the at least one leg relative to the corresponding connector in order to align the first of the at least one leg with the corresponding connector | — S808 |

| Lift the first of the at least one leg onto the tread through rotations of the first of the at least one leg with the corresponding connector | — S810 |

| Lift the first of the at least one leg to cause a gravity center of the robot cleaner to shift away from an edge of the stair | — S812 |

| Rotate a second of the at least one leg relative to the corresponding connector in order to align the second of the at least one leg with the corresponding connector | — S814 |

| Lift the second of the at least one leg onto the tread through rotations of the second of the at least one leg with the corresponding connector | — S816 |

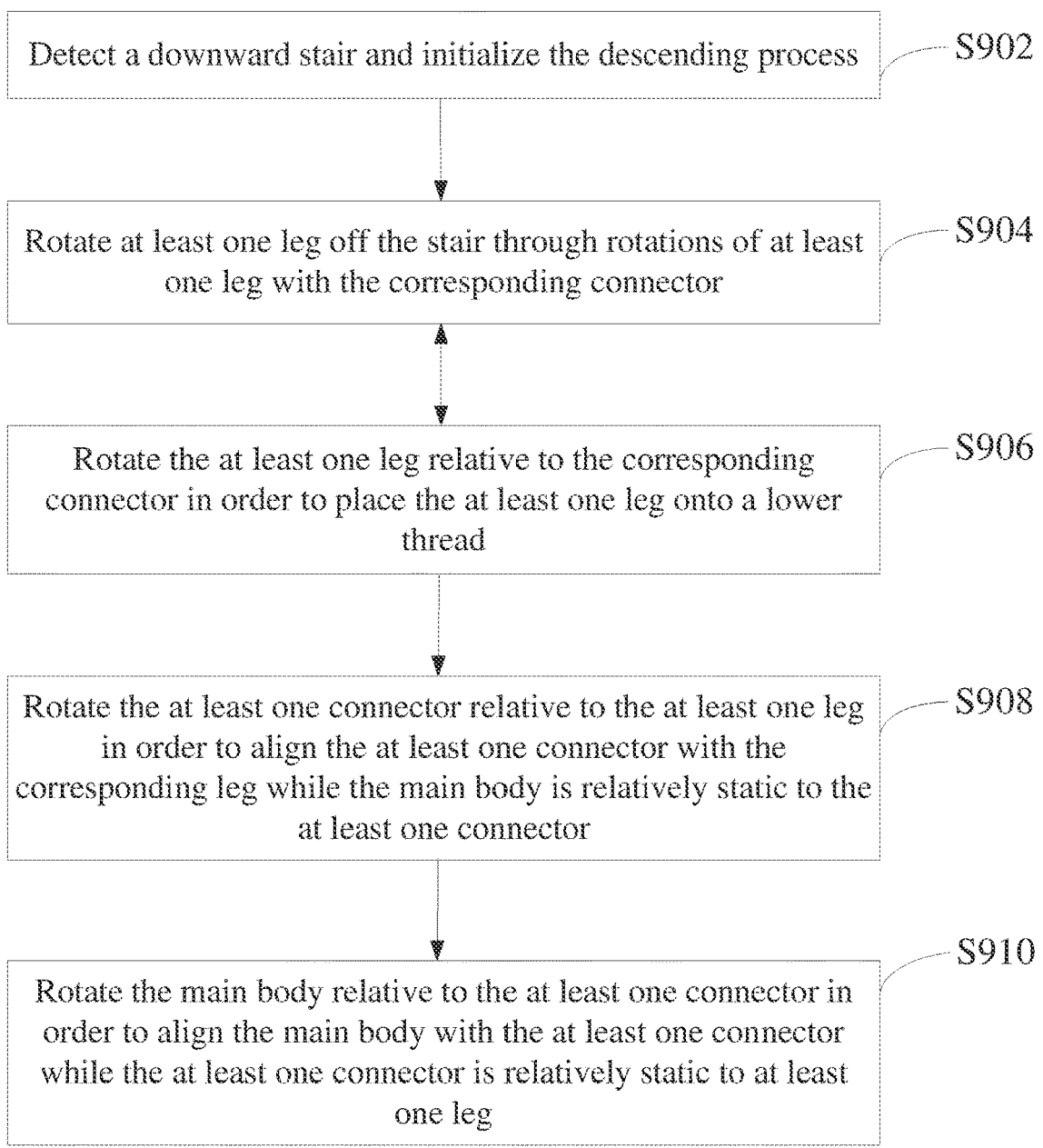

Detect a downward stair and initialize the descending process ⟋— S902

Rotate at least one leg off the stair through rotations of at least one leg with the corresponding connector ⟋— S904

Rotate the at least one leg relative to the corresponding connector in order to place the at least one leg onto a lower thread ⟋— S906

Rotate the at least one connector relative to the at least one leg in order to align the at least one connector with the corresponding leg while the main body is relatively static to the at least one connector ⟋— S908

Rotate the main body relative to the at least one connector in order to align the main body with the at least one connector while the at least one connector is relatively static to at least one leg ⟋— S910

FIG. 9

ROBOT CLEANER FOR CLIMBING AND CLEANING STAIRS

TECHNICAL FIELD

This application is related to robot cleaner. More specifically, this application relates to robot cleaners capable of climbing and cleaning stairs and methods for controlling a robot cleaner to climb and clean stairs.

BACKGROUND

A conventional robot cleaner can inhale and clean dirt and trash on a floor when automatically running on a substantially flat floor. However, such a conventional robot cleaner faces challenges in a multi-level home featuring more than one floor of living areas. Mostly, staircases are used to connect multiple levels or stories. In such cases, the conventional robot cleaner cannot automatically perform cleaning operations for all areas of the multi-level home (e.g., stairs and floors not on the same level). To use the conventional robot cleaner to clean the areas that are not on the same level, a homeowner will have to manually move the robot cleaner from one level of surface to the other level of surface; otherwise, the homeowner may use a plurality of robot cleaners each responsible to cleaning a distinct level of area. Due to these limitations, the conventional robot cleaner is not sufficiently functional for cleaning multi-level surfaces. Therefore, there is an unmet need for a robot cleaner that can automatically clean multi-level areas including stairs connecting upstairs and downstairs.

Embodiments of the disclosure provide a robot cleaner capable of climbing and cleaning stairs and a method for controlling a robot cleaner to climb and clean stairs. The disclosed embodiments address the above problems with a solution for automatically ascending/descending stairs to access areas in different levels with a single robot cleaner is needed.

SUMMARY

Embodiments of the disclosure provide an exemplary robot cleaner for cleaning a stair. The robot cleaner includes a main body configured to rotate around a first shaft. The robot cleaner further includes at least one leg each configured to rotate around a second shaft. The robot cleaner also includes at least one connector each configured to connect each leg to the main body. Each connector includes a first end attached to the first shaft and a second end attached to the second shaft. The robot cleaner is configured to climb the stair by first lifting the main body onto a tread of the stair through rotations of the main body and the at least one connector and then lifting the at least one leg onto the tread through rotations of the at least one connector and the at least one leg.

Embodiments of the disclosure also provide another exemplary robot cleaner for cleaning a stair. The robot cleaner includes a main body configured to rotate around a first shaft. The robot cleaner further includes a first leg connected to a first side of the main body through a first connector and configured to rotate around a second shaft. The robot cleaner also includes a second leg connected to a second side of the main body through a second connector and configured to rotate around a third shaft, the second side opposing the first side. The robot cleaner is configured to climb the stair by first lifting the main body onto a tread of the stair through rotations of the main body and the first and second connectors and then lifting the first and second legs onto the tread through rotations of the first and second leg and the respective first and second connectors.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 2B is a perspective view of a left leg of the robot cleaner in FIG. 2A, according to embodiments of the present disclosure.

FIG. 4 is a flowchart showing a method for controlling a robot cleaner to climb a stair, according to embodiments of the present disclosure.

FIG. 6 is a flowchart showing a method for controlling a robot cleaner to climb a stair with a gravity center control, according to embodiments of the present disclosure.

FIG. 8 is a flowchart showing a method for controlling a robot cleaner to climb a stair with a gravity center control, according to embodiments of the present disclosure.

FIG. 9 is a flowchart showing a method for controlling a robot cleaner to descend a stair, according to embodiments of the present disclosure.

DETAILED DESCRIPTION

Reference will now be made in detail to specific implementations, examples of which are illustrated in the accompanying drawings. Wherever possible, the same reference numbers will be used throughout the drawings to refer to the same or like parts.

Figure 1:
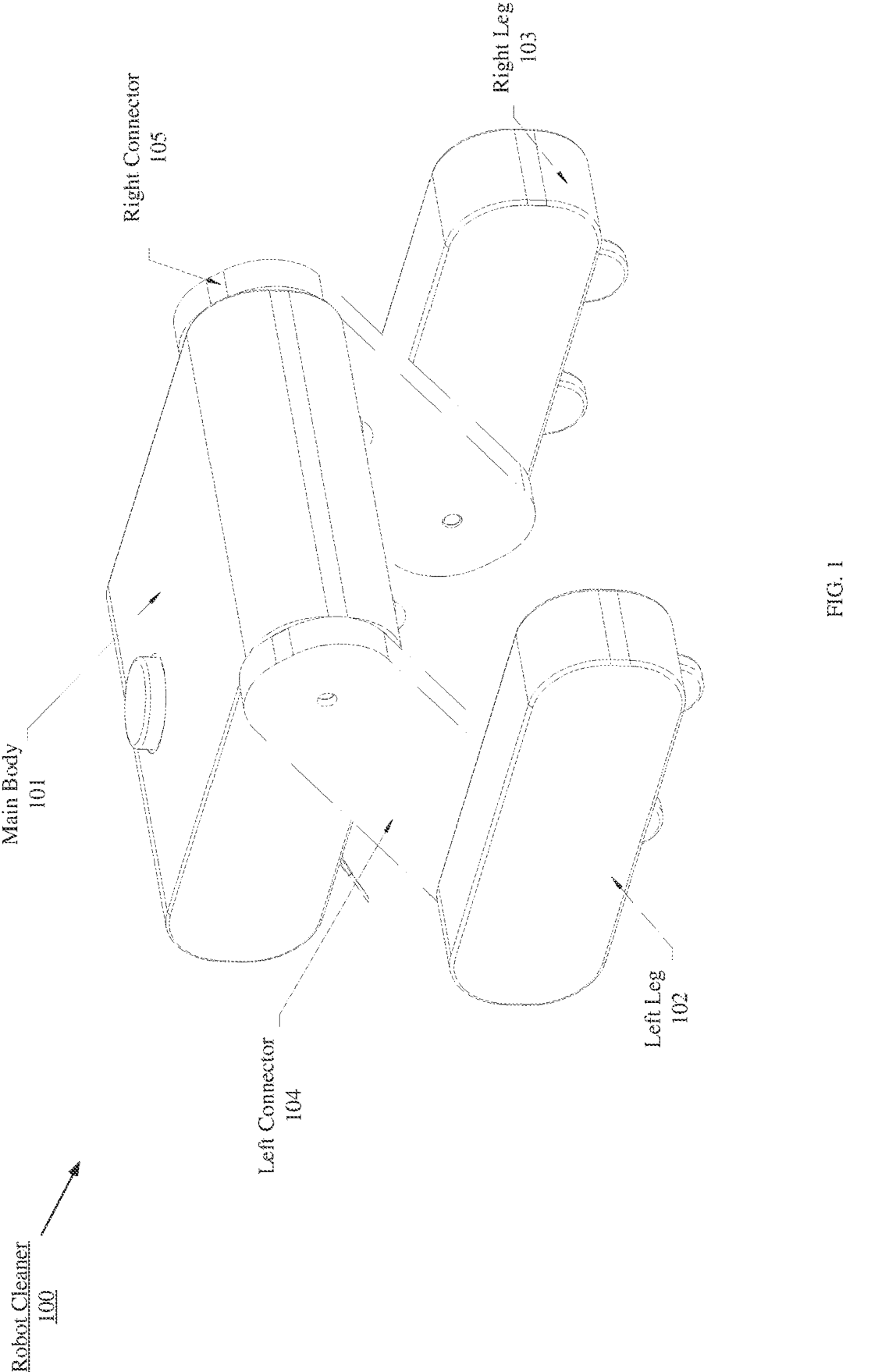
FIG. 1 is a perspective view of a robot cleaner showing different parts of the robot cleaner, according to some embodiments of the present disclosure.

FIG. 1 is a perspective view of a robot cleaner 100 showing different parts of the robot cleaner, according to some embodiments of the present disclosure. As shown in FIG. 1, robot cleaner 100 mainly includes five parts: a main body 101, a left leg 102, right leg 103, a left connector 104, and a right connector 105. Main body 101 shown in FIG. 1 is substantially in a box shape and attaches to left connector 104 and right connector 105 through shafts. Left connector 104 is substantially in a column shape. One end of left connector 104 attaches to main body 101 through a shaft mounted on main body 101, and the other end of left connector 104 attaches to left leg 102 through another shaft mounted on left leg 102. Right connector 105 is also substantially in a column shape. In some embodiments, right connector 105 and left connector 104 are substantially identical in shape and size. One end of right connector 105 attaches to main body 101 through a shaft, and the other end of right connector 105 attaches to right leg 103 through another shaft. It is contemplated that the shape of each part of robot cleaner 100 (e.g., main body 101, left leg 102, right leg 103, left connector 104, and right connector 105) is not limited to the shape or size as shown in FIG. 1, and may vary in other examples, such as a triangle, square, quadrilateral, round, or eclipse shape.

The various parts may be driven by motors to rotate around the output shafts of the respective motors. For instance, main body 101 may include motors driving main body 101 to rotate around their output shafts so that main body 101 rotates relatively to left connector 104 or right connector 105. Left leg 102 and right leg 103 each include a motor driving left leg 102 or right leg 103 to rotate around the motor's output shaft so that left leg 102 or right leg 103 each rotates relatively to left connector 104 or right connector 105, respectively. In some embodiments, the motors used in robot cleaner 100 may be servo motors. A servo motor is a self-contained electrical device that moves parts of a machine with high efficiency and great precision. A servo motor may include a sensor for positional feedback, which allows the output shaft to be moved to a particular angle, position, and velocity that a regular motor cannot do. These servo motors can provide precise control of rotation of its shaft and efficient motion of the parts with adaptive static or dynamic torque for the parts in robot cleaner 100. However, it is to be understood that the motors are not limited to servo motors, and the motors can be in any type such as stepper motors.

Figure 2A:
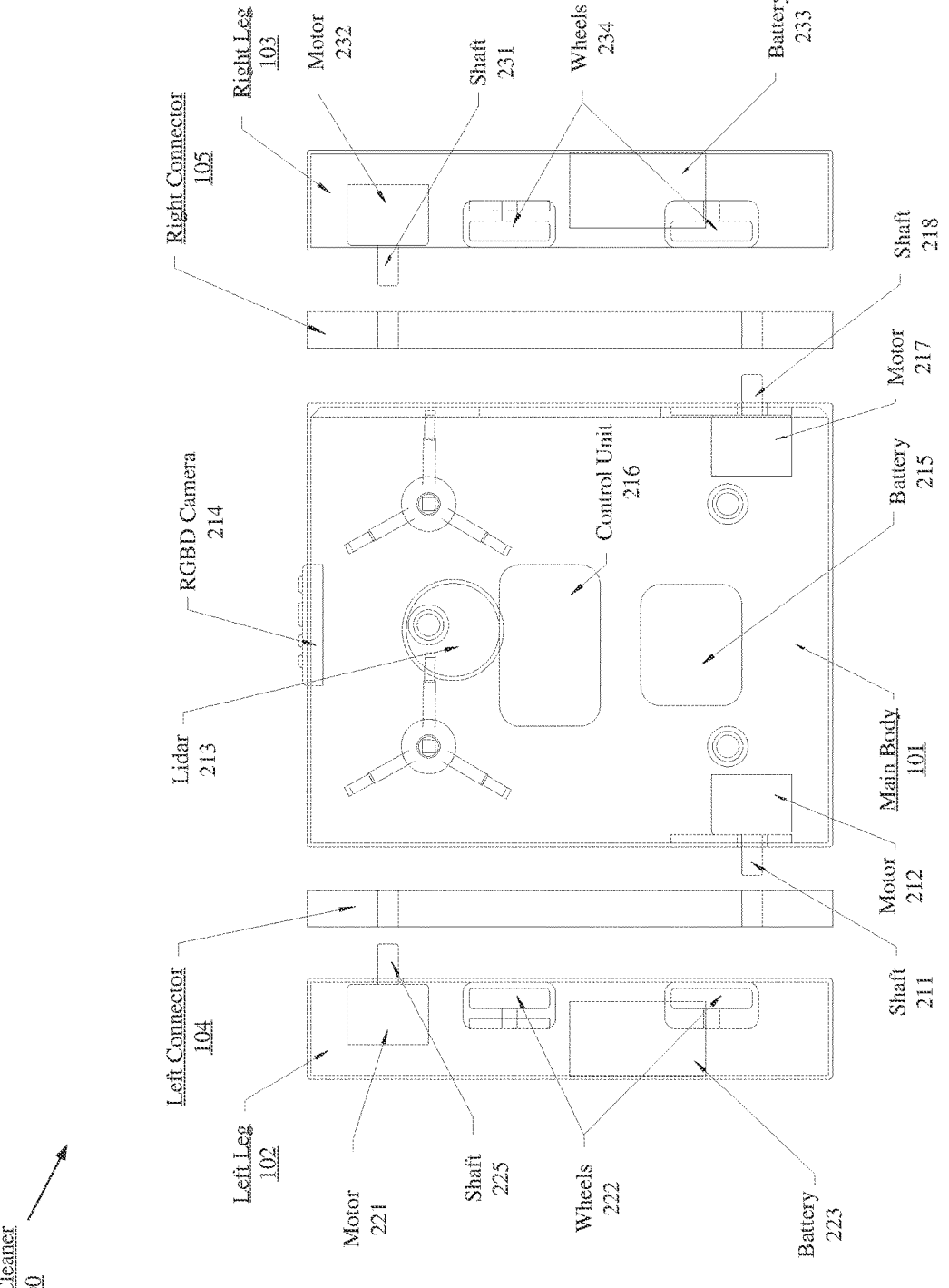
FIG. 2A is a top sectional view of a robot cleaner showing different components in each part of the robot cleaner, according to embodiments of the present disclosure.

FIG. 2A is a top sectional view showing components in each part of robot cleaner 100, according to embodiments of the present disclosure. Consistent with some embodiments, FIG. 2A shows five parts of robot cleaner 100 (from left to right): left leg 102, left connector 104, main body 101, right connector 105, and right leg 103. Left leg 102 in FIG. 2A may include a motor 221, wheels 222, and a battery 223. Left leg may further include a control unit 224 (shown in FIG. 2B). FIG. 2B is a perspective view of left leg 102 of robot cleaner 100 in FIG. 2A, according to embodiments of the present disclosure. As shown in FIG. 2B, motor 221 is mounted on left leg 102, and motor 221 includes an output shaft of motor 221 (e.g., shaft 225) connecting to left connector 104 (not shown in FIG. 2B). In some embodiments, battery 223 mounted on left leg 102 may supply power to motor 221 or control unit 224. In some embodiments, control unit 224 may activate and control motor 221 to drive left leg 102 to rotate a predetermined angle relative to left connector 104 through shaft 225. Wheels 222 may be controlled by control unit 224 to carry robot cleaner 100 round for cleaning the surroundings.

Back to FIG. 2A, one end of left connector 104 attaches to the output shaft (e.g., shaft 225) of motor 221 mounted on left leg 102. The other end of left connector 104 attaches to an output shaft (e.g., shaft 211) of motor 212 mounted on main body 101. Left connector 104 therefore serves as a bridge between left leg 102 and main body 101. Consistent with some embodiments, motor 212 may be a servo motor or any other type of motor. In some embodiments, left connector 104 is mounted to shaft 211. When motor 212 drives shaft 211 to rotate, left connector 104 rotates with shaft 211 relative to main body 101.

In some embodiments, main body 101 of robot cleaner 100 may include sensing units to perform environmental sensing, path planning, or indoor positioning that facilitates automatic cleaning functions (e.g., vacuum or mopping). As shown in FIG. 2A, the sensing units may include a Light Detection and Ranging (LiDAR) 213, and an RGBD camera 214. LiDAR 213 may be a sensing device that uses light in the form of a pulsed laser to measure ranges (variable distances) to the surrounding environment. RGBD camera 214 may be a depth camera that provides both depth (D) and color (RGB) data as the output in real-time. Depth information is retrievable through a depth map/image which is created by a 3D depth sensor such as a stereo sensor or time of flight sensor. The sensing units may further include an Inertial Measurement Unit (IMU) or an Ultra Wide Band (UWB) unit (not shown in FIG. 2A). The IMU may be a device that can measure and report specific gravity and angular rate of an object (e.g., main body 101) to which it is attached. The UWB unit uses a short-range radio technology to deliver extremely precise and fast positioning information which can be used for indoor positioning. It is to be understood that the sensing units can be mounted on main body 101, or alternatively spread around and be mounted on any other parts (e.g., left leg 102, right leg 103, left connector 104, or right connector 105).

As shown in FIG. 2A, main body 101 may further include a battery 215, a control unit 216, and another motor 217. Battery 215 may supply power to control unit 216, motor 212, motor 217, or the above-mentioned sensing units. Control unit 216 may receive signals from the sensing units and then control motors 212 or 217 to perform a climbing process. Control unit 216 may receive or send signals to other control units (e.g., control unit 224) located in other parts (e.g., left leg 102 or right leg 103) to coordinate operations with other motors (e.g., motors 221 and 232).

Control unit 216 may include components (not shown) such as a communication interface, a processor, a memory, and a storage for performing various control functions. In some embodiments, control unit 216 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to control the operations of the various parts of robot cleaner 100.

An output shaft (e.g., shaft 218) of motor 217 may attach to one end of right connector 105. When control unit 216 controls motor 217 to rotate shaft 218, shaft 218 may drive right connector 105 to rotate relative to main body 101. The other end of right connector 105 attaches to an output shaft (e.g., shaft 231) of motor 232 mounted on right leg 103. Right connector 105 therefore serves as a bridge between right leg 103 and main body 101. Consistent with some embodiments, motor 217 or motor 232 may be a servo motor or any other type of motor.

Right leg 103 has a similar but mirroring structure to left leg 102. Consistent with some embodiments, motor 232 is mounted to right leg 103. When motor 232 drives shaft 231 to rotate, right connector 105 rotates along with shaft 231 relative to right leg 103. Right leg 103 may further include a battery 233, wheels 234, and a control unit (not shown in FIG. 2A). In some embodiments, battery 233 of right leg 103 may supply power to motor 232 or the control unit of right leg 103. In some embodiments, the control unit may activate and control motor 232 to drive right leg 103 to rotate a predetermined angle relative to right connector 105 through shaft 231. Wheels 222 may be controlled by the control unit to carry robot cleaner 100 around for cleaning the surroundings.

FIGS. 3A-3G show exemplary steps of robot cleaner 100 climbing a stair, according to embodiments of the present disclosure. FIG. 4 is a flowchart showing a method 400 for controlling robot cleaner 100 to climb a stair, according to embodiments of the present disclosure. FIGS. 3A-3G are described below together with FIG. 4. In some embodiments, method 400 may be performed by various components of robot cleaner 100, e.g., main body 101, left leg 102, right leg 103, left connector 104, right connector 105, and control unit 216. In some embodiments, method 400 may include steps S402-S410. It is to be appreciated that some of the steps may be optional. Further, some of the steps may be performed simultaneously, or in a different order than shown in FIG. 4.

Consistent with some embodiments, control unit 216 may be a central processing unit that locates inside of main body 101, as shown in FIG. 2A. Control unit 216 may receive/send signals from/to other components (e.g., LiDAR 213, RGBD camera 214, or other control units in other parts of robot cleaner 100) for performing various functions (e.g., sensing, positioning, traveling, cleaning, and climbing) of robot cleaner 100. For example, control unit 216 may receive sensing information from the sensing units (e.g., LiDAR 213, RGBD camera 214) and detect dirt or a stair.

Figures 3A, 3B, 3C, 3D, 3E, 3F, 3G:
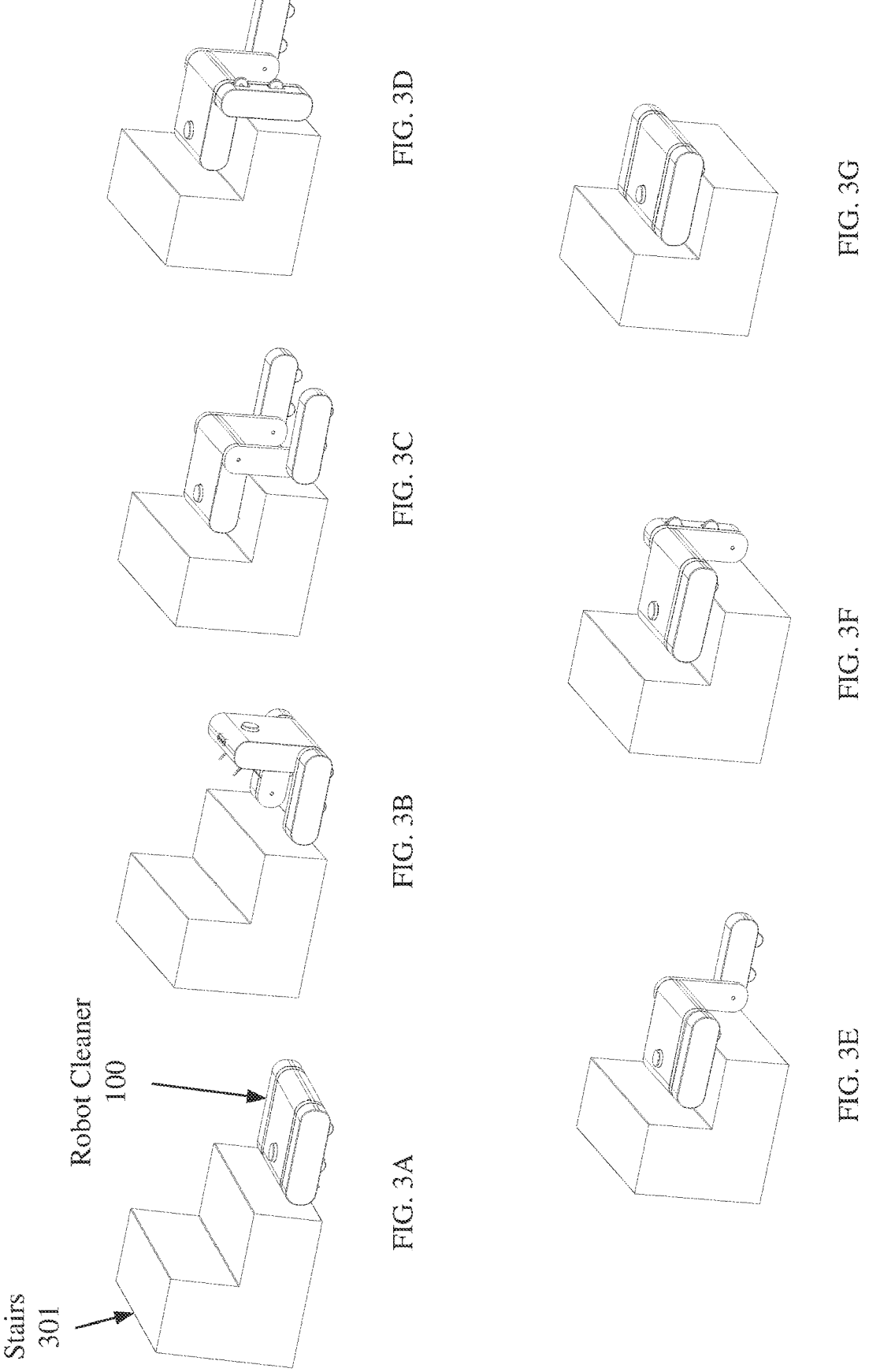
FIGS. 3A-3G show exemplary steps of a robot cleaner climbing a stair, according to embodiments of the present disclosure.

In step S402 of method 400, when control unit 216 detects a stair (e.g., a first step of stairs 301 in FIG. 3A), control unit 216 may initialize the climbing process. As shown in FIG. 3A, robot cleaner 100 stops in front of stairs 301 and prepares to climb or ascend the first step of stairs 301. It is to be noted that, when robot cleaner 100 runs and cleans floors, robot cleaner 100 is in a folded form (e.g., an initial posture of robot cleaner 100), as shown in FIG. 3A. This form keeps robot cleaner 100 move stably because all parts (e.g., the legs, the connectors, and the main body) of) of robot cleaner 100 are close to the floor, resulting in a lower gravity center of robot cleaner 100.

Consistent with some embodiments, robot cleaner 100 needs to position itself near or touch the stairs before initializing the climbing process, as shown in FIG. 3A. In some embodiments, the homeowner may manually place robot cleaner 100 in front of the stairs to trigger the climbing process. In some alternative embodiments, robot cleaner 100 may utilize a path planning algorithm pre-programed and stored in robot cleaner 100 (e.g., in control unit 216, or in a memory). Robot cleaner 100 may travel towards the stair according to the planned path and stop in front of the stairs before initializing the climbing process. It is to be understood that the path planning algorithm may not be physically stored in robot cleaner 100 when robot cleaner 100 is controlled remotely to perform the various functions.

In step S404 of method 400, control unit 216 may initialize the climbing process after detecting the stairs based on the received sensing information from the sensing units. In some embodiments, control unit 216 may send control signals to the motors mounted on main body 101 (e.g., motors 212 and 217). After receiving the signals, motors 212 and 217 each may drive the corresponding output shaft (e.g., shaft 211 and shaft 218) to rotate 90 degrees in opposite directions. For example, shaft 211 may rotate counterclockwise, and shaft 218 may rotate clockwise. As a result of the rotation of the shafts, main body 101 rotates relative to the connectors (e.g., left connector 104 and right connector 105) and backwards from the stairs. In some embodiments, main body 101 may rotate relative to the connectors by 90 degrees. For example, FIG. 3B shows a posture of robot cleaner 100 after the rotation of main body 101. In some alternative embodiments, main body 101 may rotate relative to the connectors less than 90 degrees but greater than 45 degrees. When main body 101 rotates, the legs (e.g., left leg 102 and right leg 103) and the connectors of robot cleaner 100 remain static relative to the floor.

In step S406 of method 400, control unit 216 may send control signals to the motors mounted on the legs (e.g., motors 221 and 232). After receiving the signals, motors 221 and 232 each may drive the corresponding output shaft (e.g., shaft 225 and shaft 231) to rotate about 90 degrees in opposite directions. For example, shaft 225 may rotate clockwise, and shaft 231 may rotate counterclockwise. As a result of the rotation of the shafts, the connectors (e.g., left connector 104 and right connector 105) and main body 101 rotate together relative to the legs (e.g., left leg 102 and right leg 103). The connectors and main body 101 remain relatively stationary to each other during the rotation. In some embodiments, the connectors and main body 101 may rotate 90 degrees relative to the legs. For example, FIG. 3C shows a posture of robot cleaner 100 after the rotation of the connectors and main body 101. When the connectors and main body 101 rotate, the legs (e.g., left leg 102 and right leg 103) of robot cleaner 100 remain static relative to the floor.

In some embodiments, stairs may vary in height. To accommodate different heights of the stairs, control unit 216 may adjust the length of the connectors during the climbing process so that main body 101 can raise to the same height of the stair. For example, connectors 104 and 105 may be retractable. A linear actuator may be mounted to each contractor to operate an adjustment of the length of the connector. In some embodiments, control unit 216 may send a positive or negative voltage signal to each actuator to activate the embedded actuator to increase or decrease the length of the corresponding connector. For example, before triggering motors 221 and 232 or during the rotation of motors 221 and 232, control unit 216 may control the linear actuators each embedded in the corresponding connector to increase the length of the connector. When the connectors reach a vertical posture as shown in FIG. 3C, control unit 216 may control the linear actuators to decrease the length of the connectors till main body 101 reaches a tread of the first step of stair 301 as shown in FIG. 3C.

In step S408 of method 400, control unit 216 may send a control signal to one of the motors (e.g., motor 221 or motor 232) mounted on the corresponding leg (e.g., left leg 102 or right leg 103). For example, if control unit 216 sends the control signal to motor 221 mounted on left leg 102, motor 221 may drive its output shaft (e.g., shaft 225) to rotate in an opposite direction (e.g., opposite to the rotation direction in step S406). Left leg 102 may rotate 90 degrees around shaft 225 till aligning with left connector 104 as shown in FIG. 3D.

In step S410 of method 400, after one of the legs (e.g., left leg 102) aligns with the corresponding connector (e.g., left connector 104), control unit 216 may send a control signal to one of the motors mounted on main body 101 (e.g., motor 212). After receiving the signal, motor 212 may drive its output shaft (e.g., shaft 211) to rotate 270 degrees in the same direction (e.g., same with the rotation direction in step S404). Left connector 104 and left leg 102 may rotate together around shaft 211 till aligning with main body 101 as shown in FIG. 3E.

After one leg and the corresponding connector (e.g., left leg 102 and left connector 104) realign with main body 101, control unit 216 may repeat steps S408 and S410 of method 400 to align the other leg and the corresponding connector (e.g., right leg 103 and right connector 105) with main body 101. For example, control unit 216 may send a control signal to motor 232. After receiving the signal, motor 232 may drive its output shaft (e.g., shaft 231) to rotate in an opposite direction (e.g., opposite to the rotation direction in step S406). As a result, right leg 103 may rotate 90 degrees around shaft 231 to align with right connector 105, as shown in FIG. 3F. After right leg 103 aligns with right connector 105, control unit 216 may send a control signal to motor 217. When receiving the control signal, motor 217 may drive its output shaft (e.g., shaft 218) to rotate 270 degrees in the same direction (e.g., same with the rotation direction in step S404). Right connector 105 and right leg 103 may rotate together with shaft 218 to align with main body 101. As shown in FIG. 3G, after right connector 105 and right leg 103 align with main body 101, all parts of robot cleaner 100 have climbed onto the tread of the first step of stairs 301. The posture of robot cleaner 100 in FIG. 3G returns to the initial state of robot cleaner 100 shown in FIG. 3A. Robot cleaner 100 may move around to clean the stair surface and repeat method 400 to climb more stairs (e.g., the rest of stairs 301).

It is to be understood that left leg 102 and right leg 103 may be rotated one after another in any order. That is, after step S406, control unit 216 may first send a control signal to motor 232 mounted on right leg 103 to control right leg 103 to align with right connector 105, and then send a control signal to motor 217 to drive right connector 105 rotate with right leg 103 till aligning with main body 101. After right leg 103 and right connector 105 aligning with main body 101, control unit 216 may send a control signal to motor 221 mounted on left leg 102 to control left leg 102 to align with left connector 104, and then send a control signal to motor 212 to drive left connector 104 rotate with left leg 102 till aligning with main body 101.

Consistent with some embodiments, robot cleaner 100 may align the legs and the connectors with main body 101 in an order as shown in FIGS. 3D-3G. In some alternative embodiments, robot cleaner 100 may align the legs and the connectors with main body 101 in a different order. For example, in step S408 of method 400, control unit 216 may control both legs (e.g., left leg 102 and right leg 103) to rotate simultaneously or one after another to align with the corresponding connector. After the two legs each align with the corresponding connector, in step S410 of method 400, control unit 216 may control both connectors (e.g., left connector 104 and right connector 105) to each rotate along with the corresponding leg, simultaneously or one after another, for 270 degrees relative to main body 101 for them to reach the tread of the first step of stairs 301.

In some embodiments, main body 101 may be heavier than the legs or the connectors, because main body 101 houses more components than other parts (e.g., legs, connectors). When main body 101 rotates relative to the legs or the connectors, a gravity center of robot cleaner 100 may move quickly that may impact the stability and flexibility of ascending and descending the stairs. To improve stability, robot cleaner 100 therefore may implement a different climbing process than that of method 400. FIGS. 5A-5H show exemplary steps of robot cleaner 100 climbing a stair with a gravity center control, according to embodiments of the present disclosure. FIG. 6 is a flowchart showing a method 600 for controlling robot cleaner 100 to climb a stair with a gravity center control, according to embodiments of the present disclosure. FIGS. 5A-5G are described below together with FIG. 6. In some embodiments, method 600 may be performed by various components of robot cleaner 100, e.g., main body 101, left leg 102, right leg 103, left connector 104, right connector 105, and control unit 216. In some embodiments, method 600 may include steps S602-S612. It is to be appreciated that some of the steps may be optional. Further, some of the steps may be performed simultaneously, or in a different order than shown in FIG. 6.

Figures 5A, 5B, 5C, 5D, 5E, 5F, 5G, 5H:
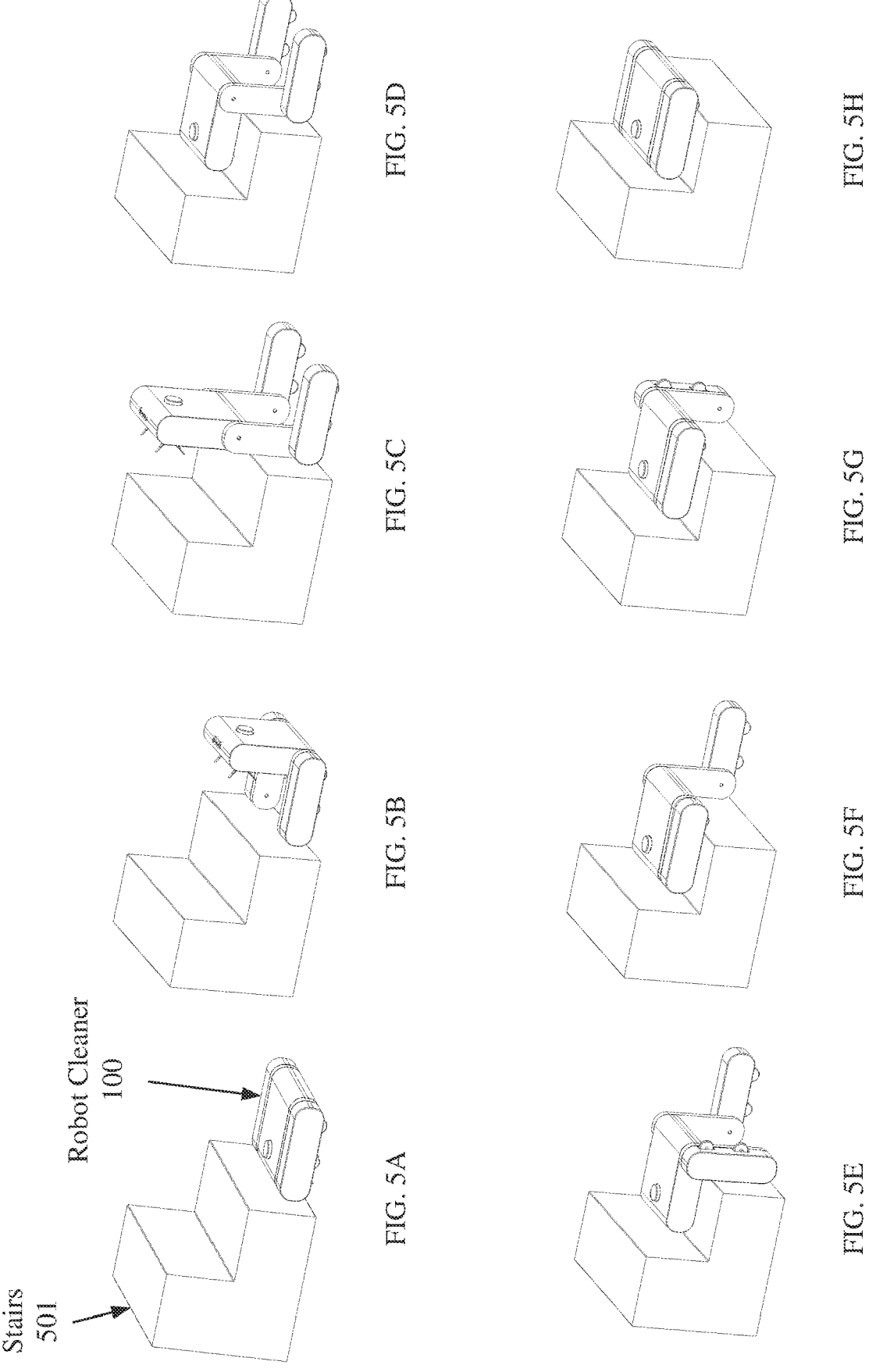
FIGS. 5A-5H show exemplary steps of a robot cleaner climbing a stair with a gravity center control, according to embodiments of the present disclosure.

In step S602 of method 600, when control unit 216 detects a stair (e.g., a first step of stairs 501 in FIG. 5A), control unit 216 may initialize the climbing process. As shown in FIG. 5A, robot cleaner 100 stops in front of stairs 501 and prepares to climb the first step of stairs 501. Step S604 of method 600 includes the same operations as those in step S404 of method 400, that is, after detecting the stairs based on the sensing information sent from the sensing units, control unit 216 may send signals to the motors mounted in main body 101 (e.g., motors 212 and 217). Consistent with some embodiments, motors 212 and 217 each may drive the corresponding output shaft (e.g., shaft 211 and shaft 218) to rotate 90 degrees in opposite directions. For example, shaft 211 may rotate counterclockwise, and shaft 218 may rotate clockwise. As a result, main body 101 rotates 90 degrees relative to the connectors (e.g., left connector 104 and right connector 105), as shown in FIG. 5B. In some alternative embodiments, main body 101 may rotate relative to the connectors less than 90 degrees but greater than 45 degrees. When main body 101 rotates, the legs (e.g., left leg 102 and right leg 103) and the connectors of robot cleaner 100 remain static relative to the floor.

In step S606 of method 600, control unit 216 may send signals simultaneously to four motors (e.g., motors 212, 217, 221, and 232) to trigger their output shaft to rotate 90 degrees, respectively. For example, motors 212 and 217 each may continuously rotate 90 degrees in the same direction as they rotate in step S604. After receiving the signals from control unit 216, motors 221 and 232 each may drive the corresponding output shaft (e.g., shaft 225 and shaft 231) to rotate 90 degrees in opposite directions. Consistent with some embodiments, shaft 225 may rotate clockwise, and shaft 231 may rotate counterclockwise. As a result of the rotation of the four shafts (e.g., shafts 211, 218, 225, and 231), as shown in FIG. 5C, the connectors each may rotate 90 degrees relative to the corresponding leg (e.g., left leg 102 and right leg 103) and main body 101 may rotate 90 degrees relative to the connectors. After the rotation, main body 101 and the two connectors are substantially in a same plane and vertical to the legs.

In some alternative embodiments, main body 101 and the two connectors may not be in the same plane as those shown in FIG. 5C. For example, main body 101 may lean forward to (e.g., rotate 80 degrees relative to the connectors) or backward from (e.g., rotate 100 degrees relative to the connectors) the stairs 501 after step S606. In another example, the two connectors may lean forward to (e.g., rotate 100 degrees relative to the legs) or backward from (e.g., rotate 80 degrees relative to the legs) the stairs 501 after step S606. The rotation angle of main body 101 may be determined based on specifications of robot cleaner 100 (e.g., the weight and the dimension of each part or component) which may impact the stability and flexibility of robot cleaner 100 in the climbing process.

Consistent with some embodiments, control unit 216 may be able to adjust the length of the connectors if the connectors are retractable. In some embodiments, control unit 216 may control the linear actuators embedded in the connectors to increase the length of the connectors before step S606. For example, control unit 216 first controls the linear actuators to increase the length of the connectors and then triggers the motors (e.g., motors 212, 217, 221, and 232) to rotate the connectors and main body 101 to the posture shown in FIG. 5C. In some alternative embodiments, control unit 216 may control the linear actuators to increase the length of the connectors after step S606. For example, after the motors lift the connectors and main body 101 vertically to the posture shown in FIG. 5C, control unit 216 may control the linear actuators to increase the length of the connectors. In some alternative embodiments, control unit 216 may control the linear actuators to increase the length of the connectors during the rotation of the connectors and main body 101. It is to be noted that, when the connectors and main body 101 rotate, the legs (e.g., left leg 102 and right leg 103) of robot cleaner 100 remain static relative to the floor.

In step S608 of method 600, control unit 216 may control motors 212 and 217 to each rotate 90 degrees in an opposite direction (e.g., opposite to their rotation direction in step S604). For example, main body 101 rotates 90 degrees forward to the stairs relative to the connectors while the connectors are relatively static to the legs and the floor. Control unit 216 may then control the linear actuators in the connectors to adjust the length of the connectors to land main body 101 onto the tread of the first step of stairs 501, as shown in FIG. 5D.

Steps S610 and S612 of method 600 may include same operations as those in steps S408 and S410, respectively. For example, in step S610 of method 600, control unit 216 may send a control signal to one of the motors mounted on the legs (e.g., motor 221 or motor 232). For example, after receiving the signal, motor 221 may drive its output shaft (e.g., shaft 225) to rotate 90 degrees in an opposite direction (e.g., opposite to its rotation direction in step S606). The rotation of shaft 225 may drive left leg 102 to rotate around shaft 225 to align with left connector 104, as shown in FIG. 5E.

In step S612 of method 600, after one of the legs (e.g., left leg 102) aligns with the corresponding connector (e.g., left connector 104), control unit 216 may send a control signal to one of the motors mounted on main body 101 (e.g., motor 212). After receiving the signal, motor 212 may drive its output shaft (e.g., shaft 211) to rotate 270 degrees in the same direction (e.g., same with its rotation direction in step S604). Left connector 104 and left leg 102 may rotate together around shaft 211 to align with main body 101, as shown in FIG. 5F.

After left leg 102 and left connector 104 align with main body 101, control unit 216 may repeat the steps S610 and S612 of method 600 to align right connector 105 and right leg 103 with main body 101. For example, control unit 216 may send a control signal to motor 232. After receiving the signal, motor 232 may drive its output shaft (e.g., shaft 231) to rotate 90 degrees in an opposite direction (e.g., opposite to its rotation direction in step S606). As a result, right leg 103 may rotate 90 degrees around shaft 231 to align with right connector 105, as shown in FIG. 5G. After right leg 103 aligns with right connector 105, control unit 216 may send a control signal to motor 217. When receiving the signal, motor 217 may drive its output shaft (e.g., shaft 218) to rotate 270 degrees in the same direction (e.g., same with its rotation direction in step S604). Right connector 105 and right leg 103 may rotate together around shaft 218 to align with main body 101. As shown in FIG. 5H, after right connector 105 and right leg 103 align with main body 101, all parts of robot cleaner 100 have climbed onto the tread of the first step of stairs 501. The posture of robot cleaner 100 in FIG. 5H returns to the initial posture of robot cleaner 100 shown in FIG. 5A. Robot cleaner 100 may move around to clean the stair surface and repeat method 600 to climb other stairs (e.g., the rest of stairs 501).

Consistent with some embodiments, robot cleaner 100 may align the legs and the connectors with main body 101 in an order as shown in FIGS. 5E-5H. In some alternative embodiments, robot cleaner 100 may align the legs and the connectors with main body 101 in a different order. For example, in step S610 of method 600, control unit 216 may control both legs (e.g., left leg 102 and right leg 103) to rotate simultaneously or one after another to align with the corresponding connector. After the two legs each align with the corresponding connector, in step S612 of method 600, control unit 216 may control the two connectors (e.g., left connector 104 and right connector 105) to each rotate along with the corresponding leg, simultaneously or one after, another 270 degrees relative to main body to reach the tread of the first step of stairs 501.

In some embodiments, to maintain a stable gravity center of robot cleaner 100 in the climbing process, control unit 216 may perform another method different than methods 400 and 600 for controlling robot cleaner 100 to climb the stairs. FIGS. 7A-7H show exemplary steps of robot cleaner 100 climbing a stair with a gravity center control, according to embodiments of the present disclosure. FIG. 8 is a flowchart showing a method 800 for controlling robot cleaner 100 to climb a stair with a gravity center control, according to embodiments of the present disclosure. For illustration purposes only, the following description of FIG. 8 is provided with respect to the control unit (e.g., control unit 216). In some embodiments, method 800 may be performed by various components of robot cleaner 100, e.g., main body 101, left leg 102, right leg 103, left connector 104, right connector 105, and control unit 216. In some embodiments, method 800 may include steps S802-S816. It is to be appreciated that some of the steps may be optional. Further, some of the steps may be performed simultaneously, or in a different order than shown in FIG. 8.

Figures 7A, 7B, 7C, 7D, 7E, 7F, 7G, 7H:
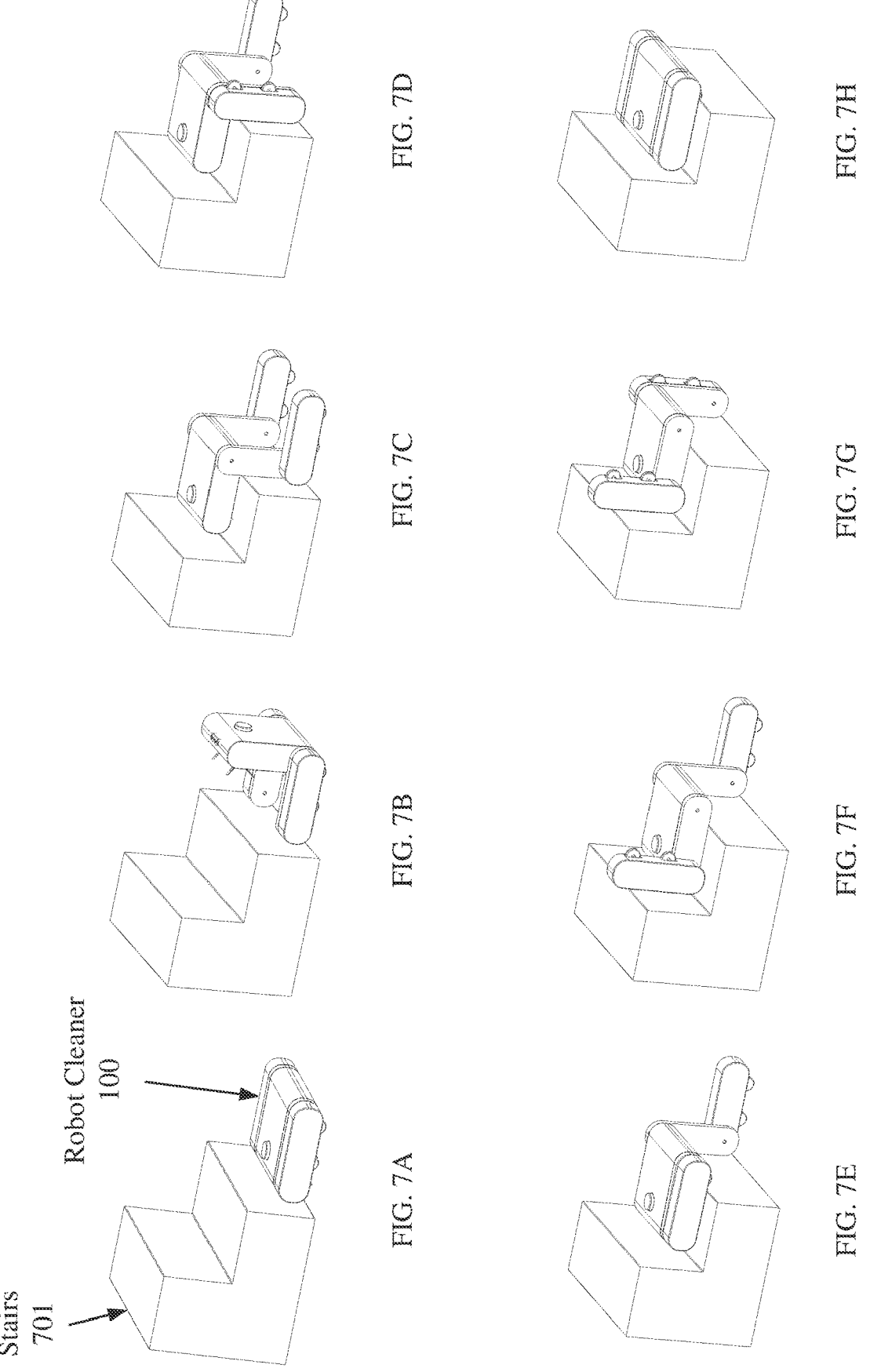
FIGS. 7A-7H show exemplary steps of a robot cleaner climbing a stair with a gravity center control, according to embodiments of the present disclosure.

In step S802 of method 800, when control unit 216 detects a stair (e.g., a first step of stairs 701 in FIG. 7A), control unit 216 may initialize the climbing process. As shown in FIG. 7A, robot cleaner 100 stops in front of stairs 701 and prepares to climb the first step of stairs 701. Steps S804-S806 of method 800 include same operations as those in steps S404-S406 of method 400. That is, after detecting the stairs based on the sensing information sent from the sensing units, control unit 216 may send signals to the motors mounted in main body 101 (e.g., motors 212 and 217). Consistent with some embodiments, motors 212 and 217 each may drive the corresponding output shaft (e.g., shaft 211 and shaft 218) to rotate 90 degrees in opposite directions. For example, shaft 211 may rotate counterclockwise, and shaft 218 may rotate clockwise. As a result, main body 101 rotates 90 degrees relative to the connectors (e.g., left connector 104 and right connector 105), as shown in FIG. 7B. In some alternative embodiments, main body 101 may rotate relative to the connectors less than 90 degrees but greater than 45 degrees. When main body 101 rotates, the legs (e.g., left leg 102 and right leg 103) and the connectors of robot cleaner 100 remain static relative to the floor.

In step S806, control unit 216 may send signals to the motors mounted on the legs (e.g., motors 221 and 232). After receiving the signals, motors 221 and 232 each may drive the corresponding output shaft (e.g., shaft 225 and shaft 231) to rotate 90 degrees in opposite directions. For example, shaft 225 may rotate clockwise, and shaft 231 may rotate counterclockwise. As a result of the rotation of the shafts, the connectors (e.g., left connector 104 and right connector 105) and main body 101 rotate together relative to the legs (e.g., left leg 102 and right leg 103) forward to the stairs. The connectors and main body 101 remain relatively stationary to each other during the rotation of the shafts. In some embodiments, the connectors and main body 101 may rotate 90 degrees as a whole piece relative to the legs. For example, FIG. 7C shows a posture of robot cleaner 100 after the rotation of the connectors and main body 101. When connectors and main body 101 rotate, the legs (e.g., left leg 102 and right leg 103) of robot cleaner 100 remain static relative to the floor.

Consistent with some embodiments, control unit 216 may adjust the length of the connectors to accommodate various heights of the stairs if the connectors are retractable. In some embodiments, control unit 216 may control the linear actuators embedded in the connectors to increase the length of the connectors before step S806. For example, control unit 216 firstly controls the linear actuators to increase the length of the connectors and then triggers the motors (e.g., motors 221, and 232) to rotate the connectors and main body 101 up to 90 degrees. In some alternative embodiments, control unit 216 may control the linear actuators to increase the length of the connectors during the rotation of the connectors. When the connectors and main body 101 rotate forward to the stairs, the legs (e.g., left leg 102 and right leg 103) of robot cleaner 100 remain static relative to the floor. After the connectors each rotate 90 degrees relative to the corresponding leg, control unit 216 may control the linear actuators embedded in the connectors to adjust the length of the connectors to land main body 101 onto the tread of the first step of stairs 501, as shown in FIG. 7C.

In step S808 of method 800, control unit 216 may send a control signal to one of the motors mounted on the legs (e.g., motor 221 or motor 232). After receiving the signal, for example, the motor mounted on the leg (e.g., motor 221) may drive its output shaft (e.g., shaft 225) to rotate in an opposite direction (e.g., opposite to its rotation direction in step S806). The leg (e.g., left leg 102) may rotate 90 degrees around the output shaft (e.g., shaft 225) to align with the corresponding connector (e.g., left connector 104) as shown in FIG. 7D.

In step S810 of method 800, after the first leg (e.g., left leg 102) aligns with the corresponding connector (e.g., left connector 104), control unit 216 may send a control signal to the motor (e.g., motor 212) associated with the corresponding connector (e.g., left connector 104). After receiving the signal, motor 212 may drive its output shaft (e.g., shaft 211) to rotate 270 degrees in the same direction (e.g., same as its rotation direction in step S804). Left connector 104 and left leg 102 may rotate together around shaft 211 to align with main body 101 and reach the tread of the first step of stairs 701, as shown in FIG. 7E.

In step S812 of method 800, after the first leg (e.g., left leg 102) and the corresponding connector (e.g., left connector 104) align with main body 101 and reach the tread of the first step of stairs 701, control unit 216 may control the motor mounted on the first leg (e.g., left leg 102) to rotate its output shaft (e.g., shaft 225) by 90 degrees. The rotation direction of shaft 225 is the same as its rotation direction in step S808.

As a result of the rotation of shaft 225, left leg 102 rotates 90 degrees around shaft 225 towards the stairs, as shown in FIG. 7F. It is noted that the rotation of left leg 102 in step S812 may shift the gravity center of robot cleaner 100 away from the edge of the first step of stairs 701. The shift of the gravity center may prevent a potential falling off of robot cleaner 100 when lifting the second leg onto the tread of the first step of stairs 701.

In step S814 of method 800, control unit 216 may send a control signal to the motor (e.g., motor 232) mounted on the second leg (e.g., right leg 103). After receiving the signal, motor 232 may drive its output shaft (e.g., shaft 231) to rotate 90 degrees in an opposite direction (e.g., opposite to its rotation direction in step S806). As a result, right leg 103 may rotate 90 degrees around shaft 231 to align with right connector 105, as shown in FIG. 7G.

In step S816 of method 800, after the second leg (e.g., right leg 103) aligns with the corresponding connector (e.g., right connector 105), control unit 216 may send a control signal to the motor (e.g., motor 217) associated with the corresponding connector (e.g., right connector 105) of the second leg. When receiving the signal, motor 217 may drive its output shaft (e.g., shaft 218) to rotate 270 degrees in the same direction as in step S804. Right connector 105 and right leg 103 may rotate together with shaft 218 to align with main body 101 on the tread of the first step of stairs 701. In some embodiments, after the second leg and the corresponding connector align with main body 101, the motor (e.g., motor 221) mounted in the first leg (e.g., left leg) may drive the first leg to realign with main body 101. In some alternative embodiments, the first leg and the second leg align with main body 101 simultaneously. As shown in FIG. 7H, after step S816, all parts of robot cleaner 100 reside onto the tread of the first step of stairs 701. The posture of robot cleaner 100 in FIG. 7H returns to the initial state of robot cleaner 100 shown in FIG. 7A. Robot cleaner 100 may repeat method 800 to climb more stairs (e.g., the rest of stairs 701).

In some alternative embodiments, control unit 216 may control to lift right leg 103 and right connector 105 onto the tread of the first step of stairs 701 by performing steps S808 and S810. After rotating right leg 103 and right connector 105 onto the tread of the first step of stairs 701, the motor mounted on right leg 103 (e.g., motor 232) may rotate right leg 103 by 90 degrees forward to stairs 701 by performing step S812. The operation may cause the gravity center of robot cleaner 100 to shift away from an edge of the first step of stairs 701 to prevent a potential falling off of robot cleaner 100 when aligning left leg 102 with main body 101. Control unit 216 then may control the motors (e.g., 217 and 221) to rotate left leg 102 and left connector 104 onto the tread of the first step of stairs 701 by performing steps S814 and S816.

In some embodiments, after robot cleaner 100 ascends a stair, it may start to clean the stair (e.g., vacuum or mopping). Due to the limited space of the tread, robot cleaner 100 may move laterally on the tread of the stair. Robot cleaner 100 may use wheels (e.g., wheels 222 and 234) including at least one of mecanum wheels, omni-direction wheels, or universal wheels to support the laterally movement on the tread of the stair. Consistent with some embodiments, the battery (e.g., battery 223 in FIG. 2B) mounted on each leg may power the corresponding wheels installed in the legs, and the control unit (e.g., control unit 224 in FIG. 2B) mounted on each leg may control the movement of the wheels on the tread.

In some embodiments, step S806 of method 800 may be substituted with steps S606 and S608 to improve the stability and the flexibility of robot cleaner 100 in the climbing process.

In some embodiments, robot cleaner 100 may descend the stairs by performing similar but reversed steps of method 400, 600, or 800. For example, when control unit 216 receives sensing information indicating a downward stair in ahead of robot cleaner 100. In some embodiments, control unit 216 may first control robot cleaner 100 to stop at the edge of the downward stair, and then control robot cleaner 100 to turn 180 degrees to turn itself backward from the edge of the stair. To perform operations of descending the stair, control unit 216 may perform method 400 in a reversed order, e.g., steps from FIG. 3G-3A.

FIG. 9 is a flowchart showing a method 900 for controlling robot cleaner 100 to descend a stair, according to embodiments of the present disclosure. In some embodiments, method 900 may be performed by various components of robot cleaner 100, e.g., main body 101, left leg 102, right leg 103, left connector 104, right connector 105, and control unit 216. In some embodiments, method 900 may include steps S902-S910. It is to be appreciated that some of the steps may be optional. Further, some of the steps may be performed simultaneously, or in a different order than shown in FIG. 9.

In step S902 of method 900, when control unit 216 detects a downward stair, robot cleaner 100 may stop in front of the downward stair and prepare to descend the stair. Consistent with some embodiments, robot cleaner 100 positions itself near the edge of the downward stair before initializing a descending process as shown in FIG. 3G. Consistent with some embodiments, the homeowner may manually place robot cleaner 100 in front of the downward stair to trigger the descending process. In some alternative embodiments, robot cleaner 100 may utilize the path planning algorithm and travel towards the downward stair according to the planned path and stop in front of the stair before initializing the descending process.

In step S904 of method 900, control unit 216 may send a control signal to one of the motors (e.g., motor 217) mounted on main body 101. After receiving the signal, motor 217 may drive its output shaft (e.g., shaft 218) to rotate 270 degrees counterclockwise. Right connector 105 and right leg 103 may rotate together around shaft 218 till touching a lower riser of the stair as shown in FIG. 3F.

In step S906 of method 900, control unit 216 may send a control signal to a motor (e.g., motor 232) mounted on the leg touching the lower riser of the stair (e.g., right leg 103) in step S904. After receiving the signal, motor 232 may drive its output shaft (e.g., shaft 231) to rotate counterclockwise. Right leg 103 rotates 90 degrees around shaft 231 till reaching a lower tread as shown in FIG. 3E.

Control unit 216 may repeat steps S904 and S906 of method 900 to rotate the other leg and the corresponding connector (e.g., left leg 102 and left connector 104) onto the lower tread as shown in FIG. 3D and FIG. 3C. It is noted that if the connectors are retractable, control unit 216 may adjust the length of the connectors in steps S904 and S906 or between steps S904 and S906 to accommodate various heights of downward stairs. In step S908 of method 900, control unit 216 may send control signals to the motors mounted on the legs (e.g., motors 221 and 232). After receiving the signals, motors 221 and 232 each may drive the corresponding output shaft (e.g., shaft 225 and shaft 231) to rotate about 90 degrees in opposite directions. For example, shaft 225 may rotate counterclockwise, and shaft 231 may rotate clockwise. As a result of the rotation of the shafts, the connectors (e.g., left connector 104 and right connector 105) and main body 101 rotate together relative to the legs (e.g., left leg 102 and right leg 103) and towards the lower tread. The connectors and main body 101 remain relatively stationary to each other during the rotation. In some embodiments, the connectors and main body 101 may rotate 90 degrees relative to the legs till the connectors each align with the corresponding legs as shown in FIG. 3B. When the connectors and main body 101 rotate, the legs (e.g., left leg 102 and right leg 103) of robot cleaner 100 remain static relative to the lower tread.

In step S910 of method 900, control unit 216 may send control signals to the motors mounted on main body 101 (e.g., motors 212 and 217). After receiving the signals, motors 212 and 217 each may drive the corresponding output shaft (e.g., shaft 211 and shaft 218) to rotate 90 degrees in opposite directions. For example, shaft 211 may rotate clockwise, and shaft 218 may rotate counterclockwise. As a result of the rotation of the shafts, main body 101 rotates relative to the connectors (e.g., left connector 104 and right connector 105) and towards the lower tread to align with the connectors. In some embodiments, main body 101 may rotate relative to the connectors by 90 degrees as shown in FIG. 3A. When main body 101 rotates, the legs (e.g., left leg 102 and right leg 103) and the connectors of robot cleaner 100 remain static relative to the lower tread. After step S910 of method 900, the posture of robot cleaner 100 returns to the initial state of robot cleaner 100 shown in FIG. 3G. Robot cleaner 100 may move around to clean the stair surface of the lower tread and repeat method 900 to descend more stairs.

Similarly, in some alternative embodiments, control unit 216 may perform methods 600 or 800 in a reversed order to obtain better stability and flexibility when descending the stairs. After robot cleaner 100 arrives at a lower tread of the stairs, robot cleaner 100 may move laterally to clean the tread. In some embodiments, main body 101 of robot cleaner 100 may house other sensing units in rear. When robot cleaner 100 in a backward position (e.g., on the tread of the first step of the downward stairs), these sensing units may detect more downward stairs for robot cleaner 100 to descend and clean.

Although the disclosure is made using a robot cleaner as an example, the disclosed embodiments may be adapted and implemented to other types of robots or automated systems that need to ascend or descend among different levels of surfaces (e.g., stairs, steps, etc.). For example, the embodiments may be readily adapted for delivery robot that needs to climb door steps or a librarian robot that needs to climb ladders to organize books on different levels of a bookshelf.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It is intended that the specification and examples be considered as exemplary only, with a true scope being indicated by the following claims and their equivalents.

What is claimed is:

1. A robot cleaner for cleaning a stair, comprising:
a main body configured to rotate around a first shaft;
at least one leg each configured to rotate around a second shaft; and
at least one connector each configured to connect each leg to the main body, wherein each connector comprises a first end attached to the first shaft and a second end attached to the second shaft,
wherein the robot cleaner is configured to climb the stair by following steps, comprising:
rotating the main body relative to the at least one connector and the at least one leg by 90 degrees;
rotating the main body and the at least one connector relative to the at least one leg to make the main body and the at least one connector be in a same plane and make the main body be vertical to the at least one leg;
rotating the main body relative to the at least one connector to make the main body be lifted on a tread of the stair; and
lifting the at least one leg onto the tread through rotations of the at least one connector and the at least one leg.

2. The robot cleaner according to claim 1, wherein the at least one leg comprises a first leg and a second leg, wherein the at least one connector comprises a first connector configured to connect the first leg to the main body and a second connector configured to connect the second leg to the main body,
wherein lifting the at least one leg onto the tread through rotations of the at least one connector and the at least one leg comprises:
lifting the first leg onto the tread through rotations of the first leg with the first connector; and
lifting the second leg onto the tread through rotations of the second leg with the second connector.

3. The robot cleaner according to claim 1, further comprising at least one first motor configured to drive the main body and the at least one connector through the first shaft.

4. The robot cleaner according to claim 3, wherein the at least one first motor comprises two motors configured to rotate in opposite directions to drive the main body to rotate relative to the at least one connector.

5. The robot cleaner according to claim 3, wherein the at least one first motor is configured to drive the at least one connector to rotate with the at least one leg relative to the main body in order to lift the at least one leg onto the tread.

6. The robot cleaner according to claim 1, further comprising a second motor configured to drive each leg and the corresponding connector through the second shaft.

7. The robot cleaner according to claim 6, wherein the second motor is configured to drive the connector to rotate together with the main body relative to the leg in order to lift the main body onto the tread.

8. The robot cleaner according to claim 6, wherein the second motor is configured to drive the leg to rotate relative to the corresponding connector in order to align the leg with the corresponding connector.

9. The robot cleaner according to claim 1, further comprising a Light Detection and Ranging (LiDAR) sensor configured to sense information of the stair or a surrounding environment.

10. The robot cleaner according to claim 1, wherein each connector comprises a linear actuator configured to adjust a length of the connector according to a height of the stair.

11. The robot cleaner according to claim 1, wherein each leg comprises at least one of mecanum wheels, omni-direction wheels, or universal wheels, configured to move the robot cleaner laterally on the tread.

12. A robot cleaner for cleaning a stair, comprising:
a main body configured to rotate around a first shaft;
a first leg connected to a first side of the main body through a first connector and configured to rotate around a second shaft; and
a second leg connected to a second side of the main body through a second connector and configured to rotate around a third shaft, the second side opposing the first side,
wherein the robot cleaner is configured to climb the stair by following steps, comprising:
rotating the main body relative to the first connector and the second connector by 90 degrees;
rotating the main body, the first connector and the second connector relative to the first leg and the second leg to make the main body, the first connector, and the second connector be in a same plane and make the main body be vertical to the first leg and the second leg;
rotating the main body relative to the first connector and the second connector to make the main body be lifted on a tread of the stair; and
lifting the first leg and the second leg onto the tread through rotations of the first connector, the second connector, the first leg, and the second leg.

13. The robot cleaner according to claim 12, wherein:
the first connector comprises a first end attached to the first shaft on the first side and a second end attached to the second shaft; and
the second connector comprises a third end attached to the first shaft on the second side and a fourth end attached to the third shaft.

14. The robot cleaner according to claim 12, further comprising:
a first motor configured to drive the main body and the first connector through the first shaft, and
a second motor configured to drive the main body and the second connector through the first shaft.

15. The robot cleaner according to claim 14, wherein the first motor and the second motor are configured to rotate in opposite directions to drive the main body to rotate relative to the first connector and the second connector.

16. The robot cleaner according to claim 14, wherein the first motor is configured to drive the first connector to rotate with the first leg relative to the main body in order to lift the first leg onto the tread, and the second motor is configured to drive the second connector to rotate with the second leg relative to the main body in order to lift the second leg onto the tread.

17. The robot cleaner according to claim 12, further comprising:
a third motor configured to drive the first leg and the first connector through the second shaft, and
a fourth motor configured to drive the second leg and the second connector through the third shaft.

18. The robot cleaner according to claim 17, wherein the third motor and the fourth motor are configured to drive the first connector and the second connector to rotate together with the main body relative to the corresponding leg in order to lift the main body onto the tread.

19. The robot cleaner according to claim 17, wherein:
the third motor is configured to drive the first leg to rotate relative to the first connector in order to align the first leg with the first connector, and the fourth motor is configured to drive the second leg to rotate relative to the second connector in order to align the second leg with the second connector.

20. The robot cleaner according to claim 12, further comprising a Light Detection and Ranging (LiDAR) sensor configured to sense information of the stair or a surrounding environment.

* * * * *